US007847010B2

(12) United States Patent
Suzuki et al.

(10) Patent No.: US 7,847,010 B2
(45) Date of Patent: Dec. 7, 2010

(54) POLYPROPYLENE BLOCK COPOLYMER, USES THEREOF, AND POLYPROPYLENE RESIN COMPOSITION CONTAINING THE SAME

(75) Inventors: Akihiro Suzuki, Yokkaichi (JP); Shigeo Mizukami, Yokkaichi (JP); Yukihito Zanka, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 421 days.

(21) Appl. No.: 11/794,623

(22) PCT Filed: Jan. 12, 2006

(86) PCT No.: PCT/JP2006/300247

§ 371 (c)(1),
(2), (4) Date: Oct. 12, 2007

(87) PCT Pub. No.: WO2006/075637

PCT Pub. Date: Jul. 20, 2006

(65) Prior Publication Data

US 2009/0292060 A1 Nov. 26, 2009

(30) Foreign Application Priority Data

Jan. 13, 2005 (JP) .............................. 2005-006059

(51) Int. Cl.
*C08L 53/00* (2006.01)
(52) U.S. Cl. ..................................... 524/505
(58) Field of Classification Search .................. 524/505
See application file for complete search history.

(56) References Cited

U.S. PATENT DOCUMENTS 4,408,019 A 10/1983 Blunt 5,990,242 A 11/1999 Naga et al.
2004/0014871 A1* 1/2004 Zanka et al. ................. 524/505

FOREIGN PATENT DOCUMENTS

| EP | 0 041 361 | 12/1981 |
| GB | 2 052 532 | 1/1981 |
| JP | 57 111307 | 7/1982 |
| JP | 57 185304 | 11/1982 |
| JP | 5 194685 | 8/1993 |
| JP | 7 286022 | 10/1995 |
| JP | 9 169826 | 6/1997 |
| JP | 2001-288331 | 10/2001 |
| JP | 2005-47943 | 2/2005 |
| JP | 2005-187623 | 7/2005 |

* cited by examiner

*Primary Examiner*—James Seidleck
*Assistant Examiner*—Deve Valdez
(74) *Attorney, Agent, or Firm*—Oblon, Spivak, McClelland, Maier & Neustadt, L.L.P.

(57) ABSTRACT

Provided are a molding appearance modifier for resins capable of controlling appearance of large-sized molded parts only by small addition, and a polypropylene resin composition capable of providing good appearance to, for example, automobile exterior parts, and has excellent molding processability. The invention relates to a propylene block copolymer having a crystalline propylene polymer portion and a propylene•ethylene random copolymer portion, wherein the crystalline propylene polymer portion has an intrinsic viscosity $[\eta]_{homo}$ of 1.2 dl/g or less; the propylene•ethylene random copolymer portion has an ethylene content of 30 to 70 wt. %, has an intrinsic viscosity $[\eta]_{copoly}$ of 2.5 to 7.0 dl/g, and is added in an amount of 40 to 80 wt. % based on the whole propylene block copolymer; and the propylene block copolymer, in its entirety, has a melt flow rate of 0.1 to 10 g/10 min; and a $[\eta]_{copoly}/[\eta]_{homo}$ ratio falls within a range of 2.5 to 10; and a polypropylene resin composition using the propylene block copolymer as a molding appearance modifier.

15 Claims, No Drawings

POLYPROPYLENE BLOCK COPOLYMER, USES THEREOF, AND POLYPROPYLENE RESIN COMPOSITION CONTAINING THE SAME

TECHNICAL FIELD

The present invention relates to a propylene block copolymer comprising a high-fluidity crystalline propylene polymer portion and a high-molecular-weight and high-content propylene•ethylene random copolymer portion and having a wide molecular weight distribution; a molding appearance modifier for polypropylene resin, which modifier contains the propylene block copolymer; and a polypropylene resin composition having, incorporated therein, a predetermined amount of the molding appearance modifier for polypropylene resin and being excellent in the appearance of its molding and in addition, having good molding processability, excellent in a flow mark characteristic during molding and suited for injection moldings such as automobile exterior parts.

BACKGROUND ART

Since polypropylene resins are light in weight and excellent in recycling efficiency, there is an increasing demand for them as automobile parts. They are, for example, polypropylene resin compositions obtained by adding, to a crystalline polypropylene resin, an ethylene thermoplastic elastomer component such as ethylene•propylene copolymer or ethylene•butene copolymer and an inorganic filler such as talc. It is proposed to improve the moldability, mechanical physical properties, appearance and the like of such propylene resin compositions by using a polypropylene resin, elastomer component and inorganic filler selected as needed depending on the using purpose.

In particular, it has been elucidated that so-called "polymer blend" is effective for heightening the dispersibility of the ethylene thermoplastic elastomer component (especially, ethylene•propylene copolymer) to the crystalline propylene resin. It is well known to those skilled in the art that use of a propylene•ethylene block copolymer (which may hereinafter be called "ICP") available by preparing a crystalline propylene resin (which may hereinafter be called "crystal component") in the first step of polymerization, followed by the preparation of an ethylene•propylene random copolymer (which may hereinafter be called "rubber component") in the second step of polymerization is effective.

Recently, there is a demand for the development of polypropylene resin compositions which can be molded into a thinner molding in a shorter molding time. One of the means for satisfying this demand is a technology using so-called "high fluidity material", that is, ICP having an increased melt flow rate (MFR). Such a high fluidity material has improved moldability or formability and from this material, thinner moldings can be obtained, but flow marks tend to appear. The term "flow marks" means tiger stripes appearing on the surface of the moldings. Moldings having flow marks on their surfaces are not suited for designing and they therefore have a markedly reduced commercial value.

Flow mark lessening technology is disclosed, for example, in Patent Document 1, Patent Document 2 or Patent Document 3.

An object of Patent Document 1 is to provide a propylene resin composition well balanced in moldability or formability and physical properties such as rigidity and impact strength. In the means for resolution, ICP (Component a) having, in its entirety, an MFR of from 10 to 130 g/10 min and having a rubber component with a weight average molecular weight of from 200000 to 1000000 is disclosed. Also another ICP (Component b) having, in its entirety, an MFR of from 0.1 to 8 g/10 min and having a rubber component with a weight average molecular weight of from 300000 to 900000 is disclosed. A technology of adding, as well as Components a and b, an inorganic filler (Component c), polyethylene (Component d) and fatty acid amide or derivative thereof (Component e) at a predetermined ratio is also disclosed. Patent Document 1 however includes neither disclosure nor suggestion about the relationship among fluidity of the crystalline propylene polymer portion, a viscosity ratio of the crystalline propylene polymer portion to the ethylene•propylene random copolymer portion, and appearance of a molding typified by flow mark characteristic.

An object of Patent Document 2 is to provide a polypropylene resin composition which hardly generates flow marks or generates less black specks, and has excellent appearance when it is molded. As a means for resolution, a polypropylene resin (A) having a propylene homopolymer portion having an intrinsic viscosity $[\eta]^A_P$ not greater than 1.3 dl/g and a propylene•ethylene random copolymer portion having an intrinsic viscosity $[\eta]^A_{EP}$ not greater than 3.0 dl/g is disclosed. Moreover, a polypropylene resin composition obtained by mixing the resin A with ICP (resin B) different from the resin A in physical properties at a specific ratio is disclosed. In Patent Document 2, however, the number of flow marks is not reduced to the satisfactory level and mechanical physical properties or moldability is sacrificed to attain this.

An object of Patent Document 3 is to provide a polypropylene resin composition exhibiting good appearance and having excellent molding processability. As a means for resolution, use of a molding modifier made of ICP having specific physical properties is disclosed. Described specifically, ICP having, at a propylene homopolymer portion (crystal portion) thereof, an MFR of 500 g/10 min or greater, having, in its entirety, an MFR of 100 g/10 min or greater and having a die swell ratio of from 1.2 to 2.5 is disclosed. In Patent Document 3, however, occurrence of flow marks is not reduced to a satisfactory level. The mechanical physical properties (especially, low temperature impact strength) or moldability is sacrificed to reduce it.

[Patent Document 1] JP-A-2001-288331

[Patent Document 2] JP-A-2002-12734

[Patent Document 3] JP-A-2004-18647

DISCLOSURE OF THE INVENTION

Problems that the Invention is to Solve

The invention has been made based on the above-described known art and problems thereof. An object of the invention is to provide a propylene block copolymer which does not easily generate flow marks in order to efficiently prepare large-sized molded parts such as bumpers while keeping a high quality level; and a molding appearance modifier for polypropylene resin which improver can improve the appearance of a molding by adding it in a small amount to a general-purpose resin component.

Another object of the invention is to provide a polypropylene resin composition suited for automobile exterior parts including bumper, rocker molding, side molding and overfender, capable of forming good appearance, and excellent in molding processability.

Means for Solving the Problems

The present inventors have carried out an extensive investigation in order to overcome the above-described problems. As a result, it has been found that a propylene block copolymer which has a high-fluidity crystalline propylene polymer portion and a high-molecular-weight and high-content propylene•ethylene random copolymer portion having a high ethylene content, and has a wide molecular weight distribution serves as a molding appearance modifier capable of overcoming the above-described problems when added in a small amount to a general purpose resin component, leading to the completion of the invention.

In a first aspect of the invention, there is thus provided a propylene block copolymer comprising a crystalline propylene polymer portion and a propylene•ethylene random copolymer portion and satisfying the following requirements (a) to (d):

(a) the crystalline propylene polymer portion has an intrinsic viscosity $[\eta]_{homo}$ not greater than 1.2 dl/g as measured at 135° C. by using decalin as a solvent, (b) the propylene•ethylene random copolymer portion has an ethylene content of from 30 to 70 wt. %, has an intrinsic viscosity $[\eta]_{copoly}$ of from 2.5 to 7.0 dl/g, and is contained in an amount of from 40 to 80 wt. % in the whole propylene block copolymer, and (c) the propylene block copolymer has, in its entirety, a melt flow rate ranging from 0.1 to 10 g/10 min, and (d) a ratio ($[\eta]_{copoly}/[\eta]_{homo}$) of the intrinsic viscosity $[\eta]_{copoly}$ of the propylene•ethylene random copolymer portion to the intrinsic viscosity $[\eta]_{homo}$ of the crystalline propylene polymer portion falls within a range of from 2.5 to 10.

In a second aspect of the invention, there is also provided a molding appearance modifier comprising as an effective component a propylene block copolymer which has a crystalline propylene polymer portion and a propylene•ethylene random copolymer portion, and satisfies the following requirements (a) to (d):

(a) the crystalline propylene polymer portion has an intrinsic viscosity $[\eta]_{homo}$ not greater than 1.2 dl/g as measured at 135° C. by using decalin as a solvent, (b) the propylene•ethylene random copolymer portion has an ethylene content of from 30 to 70 wt. %, has an intrinsic viscosity $[\eta]_{copoly}$ of from 2.5 to 7.0 dl/g, and is contained in an amount of from 40 to 80 wt. % in the whole propylene block copolymer, and (c) the propylene block copolymer has, in its entirety, a melt flow rate ranging from 0.1 to 10 g/10 min, and (d) a ratio ($[\eta]_{copoly}/[\eta]_{homo}$) of the intrinsic viscosity $[\eta]_{copoly}$ of the propylene•ethylene random copolymer portion to the intrinsic viscosity $[\eta]_{homo}$ of the crystalline propylene polymer portion falls within a range of from 2.5 to 10.

In a third aspect of the invention, there is also provided a polypropylene resin composition comprising 100 parts by weight of a polypropylene resin material to be modified and 1 to 25 parts by weight of (A) a molding appearance modifier as described in the second aspect of the invention.

In a fourth aspect of the invention, there is also provided a polypropylene resin composition according to the third aspect of the invention, wherein the polypropylene resin material to be modified contains (B) a propylene-ethylene block copolymer.

In a fifth aspect of the invention, there is also provided a polypropylene resin composition according to the third aspect of the invention, wherein the polypropylene resin material to be modified is a polypropylene resin composition containing:

(B) 65 to 99 wt. % of a propylene-ethylene block copolymer, and (C) 1 to 35 wt. % of an inorganic filler.

In a sixth aspect of the invention, there is also provided a polypropylene resin composition according to the third aspect of the invention, wherein the polypropylene resin material to be modified is a polypropylene resin composition containing:

(B) 65 to 99 wt. % of a propylene-ethylene block copolymer, and (D) 1 to 35 wt. % of an ethylene elastomer or styrene elastomer.

In a seventh aspect of the invention, there is also provided a polypropylene resin composition according to the third aspect of the invention, wherein the polypropylene resin material to be modified is a polypropylene resin composition containing:

(B) 45 to 98 wt. % of a propylene-ethylene block copolymer, (C) 1 to 40 wt. % of an inorganic filler, and (D) 1 to 40 wt. % of an ethylene elastomer or styrene elastomer.

Advantage of the Invention

The propylene block copolymer according to the invention can be used as a molding appearance modifier capable of improving the appearance of a molding of a polypropylene resin composition even by addition of a small amount thereto without damaging the original physical properties and molding properties of the composition. A polypropylene resin composition having, incorporated therein, the molding appearance modifier for polypropylene resin has excellent molding processability and flow mark characteristic and is therefore particularly suited as a large-sized injection molding material for automobile exterior parts and the like.

BEST MODE FOR CARRYING OUT THE INVENTION

The invention relates to a propylene block copolymer comprising a crystalline propylene polymer portion and a propylene•ethylene random copolymer portion and having specific physical properties; a molding appearance modifier containing the block copolymer; and a polypropylene resin composition containing the molding appearance modifier. They will hereinafter be described more specifically.

[I] Propylene Block Copolymer

1. Physical Properties of Propylene Block Copolymer

The propylene block copolymer of the invention comprises a crystalline propylene polymer portion (crystal component) and a propylene•ethylene random copolymer portion (rubber component) and each component and the entire copolymer satisfy the below-described requirements (a) to (d):

(a) Intrinsic Viscosity $[\eta]_{homo}$ of Crystalline Polypropylene Polymer Portion The crystalline polypropylene polymer portion constituting the propylene block copolymer of the invention has an intrinsic viscosity $[\eta]_{homo}$ of 1.2 dl/g or less, preferably from 0.7 to 1.2 dl/g, more preferably from 0.9 to 1.1 dl/g. The $[\eta]_{homo}$ exceeding 1.2 dl/g is not preferred because the resulting propylene block copolymer added to a propylene resin or the like as a molding appearance modifier exhibits only a low effect for lessening flow marks. The $[\eta]_{homo}$ less than 0.7 gl/g, on the other hand, is not preferred because it tends to deteriorate the impact resistance.

The intrinsic viscosity $[\eta]_{homo}$ of the crystalline polypropylene polymer portion is an intrinsic viscosity after completion of the polymerization of a propylene homopolymer portion (which may be copolymerized with a comonomer in an amount small enough not to impair the crystallinity, for example, 0.5 wt. % or less). The propylene homopolymer may be obtained by either single-stage polymerization or multi-stage polymerization. In the case of multi-stage polymerization, the $[\eta]_{homo}$ is an intrinsic viscosity of the crystalline polypropylene polymer portion taken out from the final polymerization tank. The intrinsic viscosity can be adjusted by adding hydrogen during polymerization to control the molecular weight.

The intrinsic viscosity $[\eta]_{homo}$ as used herein is a value determined by the method described later.

(b) Propylene•Ethylene Random Copolymer Portion (Rubber Component)

(b-1) Ethylene Content of Propylene•Ethylene Copolymer Portion

The ethylene content of the propylene•ethylene copolymer portion constituting the propylene block copolymer of the invention is from 30 to 70 wt. %, preferably from 30 to 60 wt. %, especially preferably from 40 to 60 wt. %. When the ethylene content is less than 30 wt. %, an effect as a molding appearance modifier is low (appearance with flow marks is not improved). When the ethylene content exceeds 70 wt. %, on the other hand, the modifier component tends not to form a uniform dispersion in a material to be modified when the copolymer itself or a composition containing it as a molding appearance modifier is injection molded. Ethylene contents outside the above-described range are therefore not preferred.

The ethylene content in the propylene•ethylene random copolymer portion is a value determined by the method described later.

(b-2) Intrinsic Viscosity $[\eta]_{copoly}$ of Propylene•Ethylene Random Copolymer Portion The intrinsic viscosity $[\eta]_{copoly}$ of the propylene•ethylene random copolymer portion (rubber component) is from 2.5 to 7.0 dl/g, preferably from 3.0 to 7.0 gl/g, especially preferably from 4.5 to 6.5 dl/g. When the $[\eta]_{copoly}$ is less than 2.5 dl/g, a molding obtained by injection molding of a composition containing the resulting modifier has flow marks and is therefore inferior in appearance. When the $[\eta]_{copoly}$ exceeds 7.0 dl/g, an MFR of the entire propylene block copolymer lowers, leading to inconvenience such as inferior molding processability of a resin composition at the time of injection molding.

The intrinsic viscosity $[\eta]_{copoly}$ of the propylene•ethylene random copolymer portion is a value determined by the method described later.

(b-3) Proportion of Propylene•Ethylene Random Copolymer Portion

The propylene•ethylene random copolymer portion (rubber component) is contained in an amount of from 40 to 80 wt. %, preferably from 45 to 75 wt. %, more preferably from 45 to 60 wt. % in the whole propylene block copolymer. When the proportion of the propylene•ethylene random copolymer portion is less than 40 wt. %, appearance with flow marks cannot be improved sufficiently. The proportion exceeding 80 wt. % is, on the other hand, not preferred because when the copolymer itself or a composition containing the copolymer as a modifier is injection molded, it does not uniformly disperse in a material to be modified and damages the appearance of the molding.

The proportion of the propylene•ethylene random copolymer portion (rubber portion) is a value determined by the method described later.

(c) MFR

The propylene block copolymer of the invention has an MFR of from 0.1 to 10 g/10 min, preferably from 0.1 to 9 g/10 min. When the MFR is less than 0.1 g/10 min, a resin composition containing it has poor molding processability at the time of injection molding. When the MFR exceeds 10 g/10 min, on the other hand, the resulting block copolymer is not effective for reducing flow marks, thereby improving the appearance.

The MFR as used herein is a value measured at 230° C. under a load of 21.18N in accordance with JIS K7210.

(d) Intrinsic Viscosity Ratio

A ratio ($[\eta]_{copoly}/[\eta]_{homo}$) of the intrinsic viscosity $[\eta]_{copoly}$ of the propylene•ethylene random copolymer portion (rubber component) to the intrinsic viscosity $[\eta]_{homo}$ of the crystalline propylene polymer portion, each constituting the propylene block copolymer of the invention is from 2.5 to 10, preferably from 3 to 9, especially preferably from 4 to 8. When the $[\eta]_{copoly}/[\eta]_{homo}$ is less than 2.5, the resulting block copolymer has an insufficient effect as a molding appearance modifier (appearance with flow marks is not improved). When it exceeds 10, gelation occurs owing to the incomplete dispersion of the rubber component. The ratios outside the above-described range are therefore not preferred.

2. Analysis Methods of Physical Properties of Propylene Block Copolymer

A ratio (Wc) of the propylene•ethylene random copolymer portion (rubber component) in the propylene block copolymer of the invention, ethylene content in the rubber component and intrinsic viscosity are measured using the below-described apparatuses and conditions in accordance with the below-described procedures.

(1) Analyzers Employed (i) Apparatus for Cross Fractionation

"CFC T-100" manufactured by DIA Instruments Co., Ltd. (which will hereinafter be abbreviated as "CFC")

(ii) Fourier Transform Infrared Absorption Spectroscopy:
    FT-IR "1760X" manufactured by Perkin Elmer, Inc.

Instead of a fixed wavelength infrared spectrophotometer which has been installed as a detector of CFC, FT-IR is connected. This FT-IR is used as a detector. A transfer line from an outlet of the solution eluted from CFC to FT-IR is set to 1 m and kept at 140° C. throughout the measurement. A flow cell installed in FT-IR has an optical path length of 1 mm and an optical path width of 5 mm$\phi$ and it is kept at 140° C. throughout the measurement.

(iii) Gel Permeation Chromatography (GPC):

As a GPC column in the latter stage portion of CFC, three columns of "AD806MS" manufactured by Showa Denko K.K. connected in series are used.

(2) Measurement Conditions of CFC:

(i) Solvent: Orthodichlorobenzene (ODCB)

(ii) Sample concentration: 4 mg/mL (iii) Injection amount: 0.4 mL (iv) Crystallization: Crystallization is caused by decreasing the temperature from 140° C. to 40° C. over about 40 minutes.

(v) Fractionation Method:
    The fractionation temperature at the time of temperature-raising elution fractionation is set at 40, 100 and 140° C., and the sample is fractionated into three fractions in total. Elution ratios (unit: wt. %) of a component eluted at 40° C. or less (Fraction 1), a component eluted at from 40 to 100° C. (Fraction 2), and a component eluted at from 100 to 140° C. (Fraction 3) are defined as $W_{40}$, $W_{100}$, and $W_{140}$, respectively. $W_{40}+W_{100}+W_{140}=100$. The resulting fractions are each automatically transported to the FT-IR analyzer as is.

(vi) Solvent flow rate at the time of elution: 1 mL/min (3) Measurement Condition of FT-IR:

After the elution of the sample solution is started from GPC of the latter stage of CFC, the FT-IR measurement is carried out under the following conditions, and GPC-IR data on the above-described respective fractions 1 to 3 are collected.

(i) Detector: MCT (ii) Resolution: 8 $cm^{-1}$ (iii) Measurement interval: 0.2 minute (12 seconds)

(vi) Integration frequency per measurement: 15 times (4) Post Treatment and Analysis of Measurement Results:

The elution amount and molecular weight distribution of the component eluted at each temperature are determined using an absorbance at 2945 $cm^{-1}$ obtained by FT-IR as a chromatogram. The elution amount is standardized such that the sum of the elution amounts of the respective eluted components is 100%. Conversion from the retention volume to the molecular weight is carried out using a calibration curve prepared in advance with standard polystyrene.

Standard polystyrenes are products with following trade names manufactured by Tosoh Corporation: F380, F288, F128, F80, F40, F20, F10, F4, F1, A5000, A2500 and A1000.

A calibration curve is prepared by injecting 0.4 mL of a solution prepared by dissolving each standard polystyrene in ODCB to give a concentration of 0.5 mg/mL (containing 0.5 mg/mL of BHT). As the calibration curve, a cubic expression obtained by approximation by the least squares method is employed. For the conversion to the molecular weight, a universal calibration curve is employed with reference to Sadao Mori, *Size Exclusion Chromatography* (Kyoritsu Shuppan). For the viscosity expression used herein ($[\eta]=K \times M^{\alpha}$), the following numerical values are used.

(i) At the time of preparation of calibration curve using standard polystyrene:

K=0.000138, $\alpha$=0.70

(ii) At the time of measurement of sample of propylene block copolymer:

K=0.000103, $\alpha$=0.78

The ethylene content distribution of each of the eluted components (distribution of the ethylene content along the molecular weight axis) is determined in terms of an ethylene content (wt. %) from a calibration curve prepared in advance using polyethylene, polypropylene, ethylene-propylene rubber (EPR) whose ethylene content is known by the $^{13}C$-NMR measurement or a mixture thereof while using a ratio of an absorbance at 2956 $cm^{-1}$ to an absorbance at 2927 $cm^{-1}$ obtained by FT-IR.

(5) Ratio (Wc) of Propylene•Ethylene Random Copolymer Portion

The ratio (Wc) of the propylene•ethylene random copolymer portion in the propylene block copolymer of the invention is defined, in theory, by the below-described equation (I) and determined by the below-described procedures.

$$W_C(\text{wt. \%}) = W_{40} \times A_{40}/B_{40} + W_{100} \times A_{100}/B_{100} \quad (\text{I})$$

In the formula (I), $W_{40}$ and $W_{100}$ each represents an eluted proportion (unit: wt. %) at each of the above-described fractions; $A_{40}$ and $A_{100}$ each represents an average ethylene content (unit: wt. %) measured at each of the fractions corresponding to $W_{40}$ and $W_{100}$ respectively; and $B_{40}$ and $B_{100}$ each represents an ethylene content (unit: wt. %) of the propylene•ethylene random copolymer portion contained in each of the fractions. These $A_{40}$, $A_{100}$, $B_{40}$ and $B_{100}$ will be determined in the manner described later.

The meaning of the equation (I) is as follows. Described specifically, the first term on the right side of the equation (I) is a term for calculating the amount of propylene•ethylene random copolymer portion contained in Fraction 1 (portion soluble at 40° C.). When Fraction 1 does not contain a propylene homopolymer and contains only a propylene•ethylene random copolymer, $W_{40}$ directly contributes to the content, in the whole, of the propylene•ethylene random copolymer portion derived from Fraction 1. Fraction 1 however contains a small amount of components (component having an extremely low molecular weight and atactic polypropylene) derived from the propylene homopolymer in addition to a component derived from the propylene•ethylene random copolymer so that correction in consideration of the propylene homopolymer is required. Thus, by multiplying $W_{40}$ by $A_{40}/B_{40}$, the amount derived from the component of the propylene•ethylene random copolymer portion in Fraction 1 is calculated. When the average ethylene content ($A_{40}$) of Fraction 1 is 30 wt. %, and the ethylene content ($B_{40}$) of the propylene•ethylene random copolymer contained in Fraction 1 is 40 wt. %, $30/40=3/4$ (i.e., 75 wt. %) of Fraction 1 is derived from the propylene•ethylene random copolymer, and 1/4 is derived from the propylene homopolymer. The multiplying operation by $A_{40}/B_{40}$ in the first term on the right side means the calculation of the contribution of the propylene•ethylene random copolymer on the wt. % ($W_{40}$) of Fraction 1. This equally applies to the second term on the right side. The content of the propylene•ethylene random copolymer portion is therefore the sum of the contributions of the propylene•ethylene random copolymer of the respective fractions.

(i) As described above, the average ethylene contents corresponding to Fractions 1 and 2 obtained by the CFC measurement are expressed by $A_{40}$ and $A_{100}$, respectively (units are each wt. %). The average ethylene content will be determined in the manner described later.

(ii) The ethylene content corresponding to the peak position in the differential molecular weight distribution curve of Fraction 1 is designated as $B_{40}$ (unit: wt. %). It is considered that all the rubber portion of Fraction 2 is eluted at 40° C. and the ethylene content cannot be defined in the same manner. In the invention, the ethylene content is therefore defined as $B_{100}=100$. The $B_{40}$ and $B_{100}$ each represents an ethylene content of the propylene•ethylene random copolymer portion contained in each fraction. It is substantially impossible to analytically determine this value, because there is no means for completely separating and recovering the propylene homopolymer and propylene•ethylene random copolymer existing as a mixture in the fraction. As a result of investigation using a variety of model samples, it has been found that with regards to $B_{40}$, use of an ethylene content corresponding to the peak position of the differential molecular weight distribution curve of Fraction 1 facilitates the explanation of an improving effect of the physical properties of the material. In addition, judging from two reasons that $B_{100}$ has crystallinity derived from the ethyene chain and the amount of the propylene•ethylene random copolymer contained in these fractions is relatively small compared with the amount of the propylene•ethylene random copolymer portion contained in Fraction 1, $B_{100}$ approximated to 100 rather matches the actual state and hardly causes an error in the calculation. The analysis is therefore carried out on the assumption of $B_{100}=100$.

(iii) Because of the above-described reasons, the ratio (Wc) of the propylene•ethylene random copolymer portion is determined in accordance with the following equation.

$$Wc(\text{wt. \%}) = W_{40} \times A_{40}/B_{40} + W_{100} \times A_{100}/100 \qquad (II)$$

Described specifically, $(W_{40} \times A_{40}/B_{40})$ which is the first term on the right side of the equation (II) represents the content (wt. %) of the propylene•ethylene random copolymer having no crystallinity; and $(W_{100} \times A_{100}/100)$ which is the second term represents the content (wt. %) of the propylene•ethylene random copolymer portion having crystallinity.

Here, $B_{40}$ and the average ethylene contents $A_{40}$ and $A_{100}$ of each of Fractions 1 and 2 obtained by and CFC measurement are determined in the following manner.

An ethylene content corresponding to the peak position of the differential molecular weight distribution curve is $B_{40}$. In addition, the sum of a product of the weight percentage at every data point and the ethylene content at every data point, each acquired as a data point at the time of measurement becomes the average ethylene content $A_{40}$ of Fraction 1. The average ethylene content $A_{100}$ of Fraction 2 is determined in a similar manner.

The meaning of setting three different fractionation temperatures will next be explained. In the CFC analysis of the invention, 40° C. is a temperature condition necessary and sufficient for fractionating only polymers having no crystallinity (for example, the majority of the propylene•ethylene random copolymer, or a component having an extremely low molecular weight and an atactic component in the propylene homopolymer portion); 100° C. is a temperature necessary and sufficient for eluting only components insoluble at 40° C. but soluble at 100° C. (for example, a component having crystallinity due to the ethylene and/or propylene chain in the propylene•ethylene random copolymer and propylene homopolymer having low crystallinity); and 140° C. is a temperature necessary and sufficient for eluting only components insoluble at 100° C. but soluble at 140° C. (for example, a component having especially high crystallinity in the propylene homopolymer and a component having an extremely high molecular weight and extremely high ethylene crystallinity in the propylene•ethylene random copolymer) and recovering the whole amount of the propylene block copolymer to be provided for the analysis. Incidentally, since $W_{140}$ does not contain the propylene•ethylene random copolymer component at all or if any, contains an extremely small amount substantially negligible, $W_{140}$ is excluded from the calculation of the ratio of the propylene•ethylene random copolymer or ethylene content of the propylene•ethylene random copolymer.

(6) Ethylene Content of Propylene•Ethylene Random Copolymer Portion

The ethylene content of the propylene•ethylene random copolymer portion in the propylene block copolymer of the invention can be determined in accordance with the following equation by using the values explained above.

Ethylene content (wt. %) of propylene•ethylene random copolymer portion=$(W_{40} \times A_{40} + W_{100} \times A_{100})/Wc$ wherein, Wc represents a ratio (wt. %) of the propylene•ethylene random copolymer portion determined previously.

(7) Measurement of Intrinsic Viscosity

Respective intrinsic viscosities $[\eta]_{homo}$ and $[\eta]_{copoly}$ of the crystalline propylene polymer portion and propylene•ethylene random copolymer portion in the propylene block copolymer of the invention are measured at 135° C. by an Ubbelohde viscometer while using decalin as a solvent.

After completion of the polymerization of the crystalline propylene polymer portion, the intrinsic viscosity $[\eta]_{homo}$ of some of the polymer sampled from a polymerization tank is measured. After polymerization of the crystalline propylene polymer portion, the intrinsic viscosity $[\eta]_F$ of the final polymer (F) obtained by the polymerization of propylene•ethylene random copolymer is measured. The $[\eta]_{copoly}$ is determined from the below-described relationship:

$$[\eta]_F = (100 - Wc)/100 \times [\eta]_{homo} + Wc/100 \times [\eta]_{copoly}$$

3. Preparation Process of Propylene Block Copolymer

The propylene block copolymer of the invention is a reaction mixture of the crystalline propylene polymer portion and the propylene•ethylene random copolymer portion. It is available by a preparation process comprising polymerization (first stage) of a propylene homopolymer portion which is a crystalline propylene polymer portion and polymerization (second stage) of a propylene•ethylene random copolymer portion following the first stage polymerization. The crystalline propylene polymer is prepared by a single-stage or multistage polymerization process (reaction conditions of the respective stages may be the same or different), while the propylene•ethylene random copolymer portion is prepared by a single stage or multistage polymerization process (reaction conditions of the respective stages may be the same or different). Accordingly, the entire preparation process of the propylene block copolymer of the invention comprises a successive multistage polymerization step having at least two stages.

No particular limitation is imposed on a catalyst to be used for the above-described polymerization. Any known catalysts such as so-called Ziegler-Natta catalysts using an organic aluminum compound component and a solid component composed essentially of a titanium atom, magnesium atom, halogen atom and an electron donative compound in combination, and metallocene catalysts can be used. Of these, Ziegler Natta catalysts causing less chain transfer during polymerization are usually preferred because a rubber component having a higher intrinsic viscosity has higher molding appearance improving effects when it is added as a modifier.

In the above-described successive multistage polymerization step having at least two stages, homopolymerization of propylene is effected at a temperature of from 50 to 150° C., preferably at from 50 to 70° C. and at a partial pressure of propylene of from 0.5 to 4.5 MPa, preferably from 1.0 to 3.0 MPa in the presence of the above-described catalyst while feeding hydrogen as a chain transfer agent, whereby a crystalline propylene polymer portion is prepared.

At the time of this polymerization, the intrinsic viscosity $[\eta]_{homo}$ of the crystalline propylene polymer portion in the propylene block copolymer of the invention must be adjusted to 1.2 dl/g or less. The concentration of hydrogen serving as a chain transfer agent must therefore be adjusted to a relatively high level to control the $[\eta]_{homo}$, though depending on the process or kind of the catalyst.

The propylene block copolymer of the invention features that a ratio of the propylene•ethylene random copolymer portion (rubber component) therein is high so that in order to maintain the catalytic activity high in the second stage polymerization of the rubber component, conditions in the first stage polymerization are preferably set at a low polymerization temperature and low partial pressure of propylene and short polymerization time in order to suppress the catalytic activity.

The crystalline propylene polymer portion may be copolymerized with an α-olefin other than propylene without damaging the advantage of the invention.

In the subsequent latter polymerization step, random copolymerization of propylene and ethylene is effected under the conditions of a temperature of from 50 to 150° C., preferably from 50 to 90° C. and a partial pressure of each of propylene and ethylene from 0.3 to 4.5 MPa, preferably from 0.5 to 3.5 MPa in the presence of the above-described catalyst (the catalyst used in the above-described first-stage polymerization step) while feeding propylene, ethylene and hydrogen, whereby a propylene•ethylene random copolymer portion is prepared and as a final product, a propylene block copolymer is prepared.

The propylene•ethylene random copolymer portion may be copolymerized with an α-olefin other than propylene and ethylene without damaging the advantage of the invention.

At the time of this copolymerization, the intrinsic viscosity $[\eta]_{copoly}$ of the propylene•ethylene random copolymer portion in the propylene block copolymer of the invention must be adjusted to from 2.5 to 7.0 dl/g and a $[\eta]_{copoly}/[\eta]_{homo}$ intrinsic viscosity ratio must be adjusted to from 2.5 to 10 so that the concentration of hydrogen as a chain transfer agent is adjusted at a relatively high level to control the $[\eta]_{copoly}$, though depending on the process or kind of the catalyst.

The invention is characterized in that ethylene content in the propylene•ethylene random copolymer portion (rubber component) in the propylene block copolymer of the invention is kept within a specific range. The ethylene content in the rubber must therefore be controlled by adjusting the ethylene concentration relative to the propylene concentration in the second stage polymerization step.

Moreover, the content of the propylene•ethylene random copolymer portion (rubber component) in the propylene block copolymer of the invention must be heightened so that conditions capable of heightening the catalytic activity (high polymerization temperature, partial pressure of each of propylene and ethylene, and long polymerization time) are preferred in the second stage rubber polymerization. Excessively high polymerization temperature however deteriorates the fluidity of powder particles so that a relatively low temperature is preferred in order to maintain good fluidity of the powder particles.

Polymerization may be any one of batch system, continuous system and semi-batch system polymerization. It is preferred to carry out the first stage polymerization step in a gas phase or liquid phase and polymerization steps on and after the second stage in a gas phase or liquid phase, especially in a gas phase. The retention time in each stage is for 0.5 to 10 hours, preferably for 1 to 5 hours.

In order to give fluidity to the powder particles of the composition prepared in the multistage polymerization step having at least two stages and to prevent gelation which means insufficient dispersing of rubber when the copolymer of the invention is injection molded, it is preferred to add an active-hydrogen-containing compound in an amount of from 100 to 1000 times the mole of the central metal atom (titanium atom in the case of a Ziegler natta catalyst) in the solid component of the catalyst and at the same time from 2 to 5 times the mole of the organic aluminum compound serving as the catalyst component after the polymerization in the first stage polymerization step but prior to or during the polymerization in the second polymerization step.

Examples of the active-hydrogen-containing compound usable here include water, alcohols, phenols, aldehydes, carboxylic acids, acid amides, ammonia and amines.

[II] Polypropylene Resin Composition

The polypropylene resin composition of the invention is a polypropylene resin composition, molding of which has excellent appearance and has appearance improved mainly in the flow mark characteristic. It is available by adding the above-described propylene block copolymer, which is a molding appearance modifier, as a third component to a general-purpose polypropylene resin material to be modified.

More specifically, it is a polypropylene resin composition having (A) a molding appearance modifier having the above-described propylene block copolymer as an effective component and a polypropylene resin material to be modified. The polypropylene resin material to be modified is, for example, (B) a propylene-ethylene block copolymer. The polypropylene resin composition may contain, in addition to them, (C) an inorganic filler, and/or (D) an ethylene or styrene elastomer as needed. These components will next be described more specifically.

1. Each Component of the Polypropylene Resin Composition

Component (A): Molding Appearance Modifier

The molding appearance modifier (A) to be used in the polypropylene resin composition of the invention contains the above-described propylene block copolymer as an effective component.

The molding appearance modifier (A) contains the above-described propylene block copolymer preferably in an amount of from 20 wt. % to 100 wt. %, more preferably from 50 wt. % to 100 wt. %, still more preferably from 70 wt. % to 100 wt. %, especially preferably from 100 wt. %, each based on the total weight of the molding appearance modifier (A).

The molding appearance modifier (A) may contain another component other than the propylene block copolymer. No particular limitation is imposed on the another component insofar as the advantage of the invention is accomplished by its addition. Examples of the another component include polyolefin resins such as polyethylene, polypropylene, modified polyethylene, and modified polypropylene, and thermoplastic resins other than the polyolefin resins such as polyamide, polycarbonate, and polyester.

Component (B): Propylene-Ethylene Block Copolymer

The propylene-ethylene block copolymer (B) to be used for the polypropylene resin composition of the invention is preferably a block copolymer containing a crystalline polypropylene polymer portion (unit A portion) and an ethylene•propylene random copolymer portion (unit B portion). The unit A portion is a crystalline polymer available by conventional homopolymerization of propylene or, in some cases, copolymerization of propylene with a small amount of another α-olefin. The crystalline polymer thus available preferably has a high density. With regards to the crystallinity of the unit A portion, its isotactic index (insoluble content when it is extracted with boiling n-heptane) is usually 90% or greater, preferably from 95 to 100%. When the unit A portion has small crystallinity, the resulting polypropylene resin (B) is inferior in mechanical strength, particularly, flexural modulus.

The unit B portion is a rubber component available by the random copolymerization of propylene and ethylene.

The amount of the unit A portion is usually adjusted to from 50 to 95 wt. %, preferably from 60 to 90 wt. % based on the total polymerization amount, while the amount of the unit B portion is usually adjusted to from 5 to 50 wt. %, preferably from 10 to 40 wt. % based on the total polymerization amount. In extraction with orthodichlorobenzene, elution of the unit A portion does not occur at 100° C. or less, while elution of the unit B portion occurs easily. The composition of the propylene-ethylene block copolymer (B) in the polymer after preparation can therefore be judged by the extraction analysis using the above-described orthodichlorobenzene.

The propylene-ethylene block copolymer (B) to be used in the polypropylene resin composition of the invention has preferably an MFR of from 10 to 200 g/10 min, more preferably from 15 to 150 g/10 min. When the MFR is less than 10 g/10 min, the resin composition is inferior in moldability, while when it exceeds 200 g/10 min, it has reduced impact resistance. The MFRs outside the above-described range are therefore not preferred.

A die swell ratio of Component (B) is preferably from 0.98 to 1.2, more preferably from 1.0 to 1.2. Die swell ratios less than 0.9 tend to deteriorate the molding processability, while those exceeding 1.2 tend to make it difficult to prepare the composition at a low cost in the ordinary preparation process.

The value Q of Component (B) is preferably from 3 to 7, more preferably from 3.5 to 6.5. The values Q less than 3 tend to deteriorate the molding processability or impact resistance, while those exceeding 7 tend to make it difficult to prepare the composition at a low cost in the ordinary preparation process.

The MFR of Component (B) is measured in a similar manner to that of the propylene block copolymer, while the value Q is determined from a weight average molecular weight and number average molecular weight as measured by GPC. The die swell ratio is determined in accordance with the following method.

The temperature in the cylinder of a melt indexer is set at 190° C. The orifice has a length of 8.00 mm, diameter of 1.00 mm$\phi$ and L/D=8. A measuring cylinder containing ethyl alcohol is placed rightly below the orifice (a distance between the orifice and the liquid level of ethyl alcohol is set at 20±2 mm). A sample is poured in the cylinder and a load is adjusted to give an extrusion amount per minute of 0.10±0.03 g. The extrudate obtained six or seven minutes after application of the load is dropped in the ethanol and the extrudate thus solidified is collected. The maximum and minimum diameters of the extrudate sample thus collected in the form of a strand are measured at three positions, that is, a portion 1 cm from the upper end, a portion 1 cm from the lower end and at a center portion. A die swell ratio is expressed by an average of six diameters.

For the preparation of Component (B), a polymerization process using a highly stereoregular catalyst is preferred. As the polymerization process, any conventionally known one can be used. In particular, gas phase fluidized bed process is preferred for the preparation of Component (B) abundant in the propylene•ethylene random copolymer portion (unit B portion). In the second stage reaction, further addition of an electron donative compound can improve the operation property of polymerization by preventing occurrence of troubles such as adhesion and occlusion.

(Component C): Inorganic Filler

In the polypropylene resin composition of the invention, an inorganic filler (C) can be added as needed. Component (C) is added in order to improve the flexural modulus of the polypropylene resin composition and reduce a linear expansion coefficient.

In the invention, no particular limitation is imposed on the composition or form of the inorganic filler (C). Any commercially available filler for polymers can be used.

Specific examples include plate-like inorganic fillers such as talc, mica and montmorillonite, fibrous inorganic fillers such as short-fiber glass fibers, long-fiber glass fibers, carbon fibers, aramide fibers, alumina fibers, boron fibers and xonotlite, whisker-shaped inorganic fillers such as potassium titanate, magnesium oxysulfate, silicon nitride aluminum boride, basic magnesium sulfate, zinc oxide, wollastonite, and calcium carbonate, granular inorganic fillers such as precipitated calcium carbonate, heavy calcium carbonate and magnesium carbonate and balloon-shaped inorganic fillers such as glass balloon. Of these, talc is especially preferred from the standpoint of the balance between physical properties and cost.

Talc having a surface treated with any one of various organic titanate coupling agents, organosilane coupling agents, modified polyolefins obtained by grafting an unsaturated carboxylic acid or anhydride thereof, fatty acids, metal salts of a fatty acid, and fatty acid esters may be used for the purpose of improving adhesion with a polymer or dispersibility.

Component (D): Ethylene Elastomer or Styrene Elastomer

An ethylene elastomer or styrene elastomer (D) can be incorporated in the polypropylene resin composition of the invention. Specific examples of the ethylene elastomer or styrene elastomer (D) include ethylene•α-olefin copolymer elastomers such as ethylene•propylene copolymer elastomer (EPR), ethylene•butane copolymer elastomer (EBR), ethylene•hexene copolymer elastomer (EHR) and ethylene•octene copolymer elastomer (EOR); ethylene•α-olefin•diene tertiary copolymer elastomer (EPDM) such as ethylene•propylene•ethylidenenorbornene copolymer elastomer, ethylene•propylene•butadiene copolymer elastomer, and ethylene•propylene•isoprene copolymer elastomer; and styrene elastomers such as styrene•butadiene•styrene triblock copolymer (SBS), styrene•isoprene•styrene triblock copolymer (SIS), hydrogenated styrene•butadiene•styrene triblock copolymer (SEBS), and hydrogenated styrene•isoprene•styrene triblock copolymer (SEPS).

The above-described hydrogenated styrene•butadiene•styrene triblock copolymer is a styrene-ethylene-butene-styrene block copolymer when its polymer main chain is considered from the standpoint of a monomer unit so that it is usually abbreviated as SEBS.

Two or more of these ethylene elastomers and styrene elastomers may be used as a mixture as Component (D).

The ethylene•α-olefin copolymer elastomer is prepared by polymerizing monomers in the presence of a catalyst. Examples of the catalyst usable here include titanium compounds such as titanium halide, organic aluminum-magnesium complexes such as alkyl aluminum-magnesium complexes, so-called Ziegler catalysts such as alkyl aluminums and alkyl aluminum chlorides, and metallocene compound catalysts as described in WO-91/04257. As the polymerization process, any one of gas phase fluidized bed polymerization, solution polymerization and slurry polymerization can be employed. Examples of the commercially available product include "ED Series" of JSR, "TAFMER P Series" and "TAFMER A Series", each of Mitsui Chemicals, "Engage EG Series" of DuPont Dow, and "Tuftec H Series" of Asahi Kasei Chemicals. Any of them is usable in the invention.

The preparation process of a hydrogenated triblock copolymer (SEBS, SEPS) as the styrene elastomer will next be outlined. Such a triblock copolymer can be prepared by the ordinary anion living polymerization process. In accordance with this process, the hydrogenated triblock copolymer can be prepared by polymerizing styrene, butadiene and styrene successively into the corresponding triblock copolymer and then hydrogenating the resulting product (preparation process of SEBS) or by preparing a diblock copolymer of styrene and butadiene first, followed by hydrogenation to the triblock copolymer using a coupling agent. A hydrogenated styrene-isoprene-styrene triblock copolymer (SEPS) can be prepared in a similar manner except for the use of isoprene instead of butadiene.

The ethylene elastomer or styrene elastomer (D) to be used in the polypropylene resin composition of the invention has preferably an MFR of from 0.5 to 150 g/10 min, more preferably from 0.7 to 150 g/10 min, especially preferably from 0.7 to 80 g/10 min (as measured at 230° C. under a load of 2.16 kg). In consideration of an automobile exterior material which is a principal use of the polypropylene resin composition of the invention capable of providing excellent appearance to the molding thereof, elastomers having an MFR within the above-described range are especially preferred.

(E) Additional Component (Optional Component)

In the polypropylene resin composition of the invention, a component (optional component) other than the above-described components (A) to (D) can be incorporated further without seriously damaging the advantage of the invention. Examples of such an additional component (optional component) include phenolic or phosphorous antioxidants, weathering stabilizers such as hindered amine, benzophenone and benzotriazole compounds, nucleating agents such as organoaluminum compounds and organophosphorous compounds, dispersing agents typified by metal salts of stearic acid and coloring substances such as quinacridone, perylene, phthalocyanine, titanium oxide and carbon black.

2. Components of the Polypropylene Resin Composition

The polypropylene resin composition of the invention can be obtained using the above-described components (A) to (D) in combination. Typical compositions include compositions having Components (A) and (B), compositions having Components (A), (B) and (C), compositions having Components (A), (B) and (D), and compositions having Components (A), (B), (C) and (D). If necessary, Component (E) is added further.

(1) Polypropylene Resin Composition Composed of Components (A) and (B)

The polypropylene resin composition composed of Components (A) and (B) contains the molding appearance modifier (A) in an amount of from 1 to 25 parts by weight, preferably from 2 to 20 parts by weight, more preferably from 2 to 15 parts by weight, especially preferably from 2 to 9 parts by weight, most preferably from 3 to 7 parts by weight, based on 100 parts by weight of the ethylene•propylene block copolymer. Amounts of the molding appearance modifier (A) less than 1 part by weight deteriorate the molding appearance modifying effect, while those exceeding 25 parts by weight reduce the fluidity.

(2) Polypropylene Resin Composition Composed of Components (A), (B) and (C)

The polypropylene resin composition composed of Components (A), (B) and (C) contains the molding appearance modifier (A) in an amount of from 1 to 25 parts by weight, preferably from 2 to 20 parts by weight, more preferably from 2 to 15 parts by weight, especially preferably from 2 to 9 parts by weight, most preferably from 3 to 7 parts by weight, each based on 100 parts by weight, in total, of Components (B) and (C). With regards to the proportions of Components (B) and (C), the proportion of Component (B) is from 65 to 99 wt. %, preferably from 70 to 98 wt. %, more preferably from 75 to 98 wt. %, especially preferably from 80 to 97 wt. %; and that of Component (C) is from 1 to 35 wt. %, preferably from 2 to 30 wt. %, more preferably from 2 to 25 wt. %, especially preferably from 3 to 20 wt. %, relative to the whole amount of the polypropylene resin material to be modified. When the proportion of Component (C) is less than 1 wt. %, it cannot exhibit its effect sufficiently and the resulting composition has only poor flexural modulus. Proportions of it exceeding 35 wt. %, on the other hand, deteriorate the brittle temperature and lower moldability.

(3) Polypropylene Resin Composition Composed of Components (A), (B) and (D).

The polypropylene resin composition composed of Components (A), (B) and (D) contains the molding appearance modifier (A) in an amount of from 1 to 25 parts by weight, preferably from 2 to 20 parts by weight, more preferably from 2 to 15 parts by weight, especially preferably from 2 to 9 parts by weight, most preferably from 3 to 7 parts by weight, each based on the 100 parts by weight, in total, of Components (B) and (D). With regards to the proportions of Components (B) and (D), the proportion of Component (B) is from 65 to 99 wt. %, preferably from 70 to 98 wt. %, more preferably from 75 to 98 wt. %, especially preferably from 83 to 97 wt. %; and the proportion of Component (D) is from 1 to 35 wt. %, preferably from 2 to 30 wt. %, more preferably from 2 to 25 wt. %, especially preferably from 3 to 17 wt. %, each based on the total amount of the whole polypropylene resin material to be modified. When the proportion of Component (D) is less than 1 wt. %, it cannot exhibits its effect fully. Proportions exceeding 35 wt. %, on the other hand, presumably cause a reduction in rigidity and in addition, pose a cost-wise problem. The proportions of these components vary with the using purpose or application of the resulting polypropylene resin composition. They are not limited to the above-described ones and are different by the kind of elastomers. It is therefore important to select proper ones depending on the application or using purpose.

(4) Polypropylene Resin Composition Composed of Components (A), (B), (C) and (D)

The polypropylene resin composition composed of Components (A), (B), (C) and (D) contains the molding appearance modifier (A) in an amount of from 1 to 25 parts by weight, preferably from 2 to 20 parts by weight, more preferably from 2 to 15 parts by weight, especially preferably from 2 to 9 parts by weight, most preferably from 3 to 7 parts by weight based on 100 parts by weight, in total, of Components (B), (C) and (D). With regards to the proportions of Components (B), (C) and (D) relative to the whole polypropylene resin material to be modified, that of Component (B) is from 45 to 98 wt. %, preferably from 47 to 96 wt. %, more preferably from 50 to 92 wt. %; that of Component (C) is from 1 to 40 wt. %, preferably from 2 to 35 wt. %, more preferably from 4 to 32 wt. %; and that of Component (D) is from 1 to 40 wt. %, preferably from 2 to 35 wt. %, more preferably from 4 to 32 wt. %.

3. Preparation of Polypropylene Resin Composition

The polypropylene resin composition of the invention can be prepared by mixing the above-described components at the above-described proportions or kneading them in an ordinary kneading machine, for example, an extruder such as single screw extruder or twin screw extruder, or kneading machine such as Banbury mixer, roll, Brabender plastograph, or kneader at a preset temperature of from 180 to 250° C. Of these kneading machines, an extruder, especially a twin screw extruder is preferred for the preparation of the polypropylene resin composition.

4. Molding of Polypropylene Resin Composition

The polypropylene resin composition of the invention can be desirably formed or molded. No particular limitation is imposed on the forming or molding method and a proper method is adopted depending on its using purpose. For example, injection molding or extrusion method can be employed. The polypropylene resin composition however exhibits excellent molding processability, flow mark characteristic, and weld appearance and thus shows great effects when a large-scale injection molding method is employed. It is therefore suited for use in automobile exterior parts including bumper, rocker molding, side molding and overfender.

EXAMPLES

The invention will hereinafter be described in further detail by Examples. It should however be borne in mind that the invention is not limited to or by them unless otherwise they depart from the scope of the invention.

The measuring methods of physical properties and preparation examples of resins employed in Examples will next be described.

1. Measuring Methods of Physical Properties (1) Melt flow rate (MFR): It was measured at 230° C. under a load of 2.16 kg in accordance with ASTM-D1238.

(2) Izod impact strength: It was measured at −30° C. by using a notched specimen in accordance with JIS-K7110 and ranked by the below-described criteria.

A: having an equal strength to that of a material to be modified.

B: having a strength at least 10% lower than that of a material to be modified.

(3) Appearance of molding: By using an injection molding machine having a clamping pressure of 170 tons and a mold having, at a short side, a film gate of 2 mm wide, a sheet of 350 mm×100 mm×2 mm thickness was prepared by injection molding at a molding temperature of 220° C. Generation of flow marks was visually observed and a distance from the gate to the position at which a flow mark appeared was measured. The appearance of the molding was evaluated in accordance with the following criteria.

A: distance to flow mark exceeds 200 mm.

B: distance to flow mark is not greater than 200 mm.

2. Propylene Block Copolymer (A)

Propylene block copolymers (Modifiers 1 to 7) prepared in the below-described Preparation Example 1 to Preparation Example 7 were employed. Reaction conditions of each polymerization step and physical properties of the crystalline propylene polymer and ethylene•propylene random copolymer thus prepared were shown in Table 1.

Preparation Example 1

(i) Preparation of a solid catalyst component (a): Into a tank having an internal volume of 50 liters and equipped with a stirrer, which tank had been purged with nitrogen, was introduced 20 liters of dehydrated and deoxygenated n-heptane, followed by the introduction of 10 moles of magnesium chloride and 20 moles of tetrabutoxy titanium. After they were reacted at 95° C. for 2 hours, the temperature was decreased to 40° C. Reaction was conducted for further 3 hours after introduction of 12 liters of methylhydropolysiloxane (viscosity: 20 centistokes). The reaction mixture was then taken out from the tank and a solid component thus formed was washed with n-heptane.

Then, 5 liters of dehydrated and deoxygenated n-heptane was introduced into the above-described tank equipped with a stirrer, followed by the introduction of 3 moles, in terms of magnesium atom, of the solid component prepared above. After 2.5 liters of n-heptane was mixed with 5 moles of silicon tetrachloride, the resulting mixture was introduced into the tank at 30° C. over 30 minutes. The temperature was raised to 70° C. and the reaction was effected for 3 hours. The reaction mixture was taken out from the tank and the resulting solid component was washed with n-heptane.

After 2.5 liters of dehydrated and deoxygenated n-heptane was then introduced into the above-described tank equipped with a stirrer, 0.3 mol of phthalic chloride was introduced thereinto at 90° C. for 30 minutes while mixing. They were reacted at 95° C. for 1 hour. After completion of the reaction, the reaction mixture was washed with n-heptane. At room temperature, 2 liters of titanium tetrachloride was added and after the temperature was raised to 100° C., reaction was effected for 2 hours. After completion of the reaction, the reaction mixture was washed with n-heptane. Then, 0.6 liter of silicon tetrachloride and 8 liters of n-heptane were introduced into the tank. The resulting mixture was reacted at 90° C. for 1 hour. The reaction mixture was washed sufficiently with n-heptane to yield a solid component. The resulting solid component was found to contain 1.30 wt. % of titanium.

Next, 8 liters of n-heptane, 400 g of the resulting solid component, 0.27 mole of t-butyl-methyl-dimethoxysilane and 0.27 mole of vinyltrimethylsilane were introduced into the tank equipped with a stirrer, which had been purged with nitrogen, and they were brought into contact with each other at 30° C. for 1 hour. The reaction mixture was then cooled to 15° C., followed by the introduction of 1.5 moles of triethylaluminum diluted in n-heptane over 30 minutes at 15° C. After the introduction, the temperature was raised to 30° C. and the reaction was effected for 2 hours. The reaction mixture was then taken out from the tank and washed with n-heptane to yield 390 g of a solid catalyst component (a).

The resulting solid catalyst component (a) contained 1.22 wt. % of titanium.

Further, 6 liters of n-heptane and 1 mole of triisobutyl aluminum diluted in n-heptane were introduced over 30 minutes at 15° C., followed by prepolymerization by introducing propylene at a rate of about 0.4 kg/hour for 1 hour while preventing the temperature from exceeding 20° C. As a result, a solid catalyst component (a) containing polypropylene in which 0.9 g of propylene had been polymerized per g of a solid was obtained.

(ii) Preparation of Propylene•Ethylene Block Copolymer

Polymerization was performed in a continuous reactor in which two fluidized-bed reactors having an internal volume of 230 liters were connected to each other. In the first reactor, the polymerization temperature and propylene partial pressure were set at 55° C. and 18 kg/cm² (absolute pressure), respectively; and hydrogen as a molecular weight controlling agent was continuously fed to give a hydrogen/propylene molar ratio of 0.056 while feeding triethylaluminum at a rate of 5.25 g/hr and the above-described catalyst, as the solid catalyst component (a), to give a polymer polymerization rate of 14 kg/hr. The powder (crystalline propylene polymer) obtained by polymerization in the first reactor was continuously taken out from the reactor so that the amount of powder remaining in the tank be 40 kg and was then, transferred continuously to the second reactor (second stage polymerization step).

In the second reactor, the polymerization temperature and pressure were set at 80° C. and 2.0 MPa, respectively; propylene and ethylene were continuously fed to give an ethylene/propylene molar ratio of 0.50; hydrogen as a molecular weight controlling agent was continuously fed to give a hydrogen/propylene molar ratio of 0.0013; and ethyl alcohol as an active hydrogen compound was fed so that it would be 2.1 times the mole of triethylaluminum. The powder obtained by the polymerization in the second reactor was continuously taken out into a vessel so that the amount of powder remaining in the reactor be 50 kg. A nitrogen gas containing water vapor was introduced to terminate the reaction, whereby a propylene•ethylene block copolymer was obtained (second stage polymerization step). The propylene•ethylene block copolymer thus obtained was designated as Modifier-1.

Preparation Examples 2 to 4, and 6 to 9

Propylene•ethylene block copolymers (Modifier-2 to Modifier-4, and Modifier-6 to Modifier-9) were prepared using a similar catalyst and similar polymerization process to those employed in Preparation Example 1 except that the propylene and hydrogen amount in the first stage polymerization step, feeding amounts of propylene and ethylene and hydrogen amount in the second stage polymerization step, and polymerization time and polymerization temperature in each stage were changed as shown in Table 1.

Preparation Example 5

After a stainless autoclave having an internal volume of 200 liters was purged adequately with a propylene gas, 60 liters of n-heptane, 5 g of the catalyst used in Preparation Example 1, and 15 g of triethylaluminum were charged in the autoclave. The temperature was raised to 75° C. and propylene was supplied for 3.4 hours at a rate of 10 kg/hr. During these hours, hydrogen was also introduced continuously to give an MFR of 160 g/10 min. The pressure in the reactor was 0.55 MPa at that time, but it was reduced to 0.20 MPa over 30 minutes by terminating the supply of propylene and hydrogen, whereby the first stage polymerization step was terminated.

Then, the gas was purged from the reactor to remove hydrogen until the pressure in the reactor became 0.02 MPa and the temperature was changed to 65° C. In the presence of the first stage polymer portion, propylene and ethylene were introduced for 1.3 hours at a rate of 1.65 kg/hr and 1.20 kg/hr, respectively. The pressure in the reactor at that time was 0.03 MPa. When the pressure in the reactor became 0.02 mPa by terminating the supply of propylene and ethylene thereto, the reaction was terminated (second stage polymerization step).

After 1.8 liters of butanol was added to the resulting block copolymer and the catalyst was decomposed over 3 hours at 70° C., the catalyst was removed by washing with water. The residue was then subjected to centrifugal separation and drying, whereby a propylene•ethylene block copolymer (Modifier-5) was obtained.

TABLE 1

| | | | Preparation example 1 | Preparation Example 2 | Preparation Example 3 | Preparation Example 4 | Preparation Example 5 |
|---|---|---|---|---|---|---|---|
| Polymerization mode | | | Gas phase | Gas phase | Gas phase | Gas phase | Slurry |
| Crystalline propylene polymer by first stage polymerization | Polymerization Temp. | ° C. | 55 | 55 | 55 | 55 | 75 |
| | Mean residence time | Hr | 2.7 | 2.8 | 2.8 | 2.7 | 3.9 |
| | Hydrogen/propylene | Molar ratio | 0.056 | 0.058 | 0.057 | 0.021 | — |
| Propylene•ethylene copolymer by second stage polymerization | Polymerization Temp. | ° C. | 80 | 80 | 60 | 80 | 65 |
| | Mean residence time | Hr | 1.6 | 1.6 | 1.5 | 1.5 | 1.4 |
| | Hydrogen/propylene | Molar ratio | 0.0013 | 0.0019 | 0.038 | 0.0013 | — |
| | Ethylene/propylene | Molar ratio | 0.50 | 0.95 | 0.51 | 0.50 | — |
| $[\eta]_{homo}$ | | dl/g | 1.03 | 1.03 | 1.03 | 1.48 | 1.02 |
| $[\eta]_{copoly}$ | | dl/g | 5.77 | 5.08 | 3.05 | 6.10 | 7.93 |
| $[\eta]_{copoly}/[\eta]_{homo}$ | | dl/g | 5.60 | 4.93 | 2.96 | 4.12 | 7.77 |
| Content of propylene•ethylene copolymer | | wt. % | 55 | 53 | 52 | 55 | 8.5 |
| Ethylene content of propylene•ethylene copolymer | | wt. % | 40 | 58 | 45 | 40 | 43 |
| MFR | | g/10 min | 0.41 | 0.27 | 8.0 | 0.37 | 65 |
| Propylene•ethylene block copolymer | | | Modifier-1 | Modifier-2 | Modifier-3 | Modifier-4 | Modifier 5 |

| | | | Preparation Example 6 | Preparation Example 7 | Preparation Example 8 | Preparation Example 9 |
|---|---|---|---|---|---|---|
| Polymerization mode | | | Gas phase | Gas phase | Gas phase | Gas phase |
| Crystalline propylene polymer by first stage polymerization | Polymerization Temp. | ° C. | 55 | 75 | 55 | 75 |
| | Mean residence time | Hr | 2.8 | 2.7 | 2.9 | 2.8 |
| | Hydrogen/propylene | Molar ratio | 0.058 | 0.057 | 0.157 | 0.157 |
| Propylene•ethylene copolymer by second stage polymerization | Polymerization Temp. | ° C. | 60 | 80 | 80 | 80 |
| | Mean residence time | Hr | 1.6 | 1.5 | 1.5 | 1.6 |
| | Hydrogen/propylene | Molar ratio | 0.069 | 0.0013 | 0.0007 | 0.0003 |
| | Ethylene/propylene | Molar ratio | 0.51 | 0.54 | 0.52 | 0.56 |
| $[\eta]_{homo}$ | | dl/g | 1.03 | 1.03 | 0.61 | 0.61 |
| $[\eta]_{copoly}$ | | dl/g | 2.21 | 5.70 | 6.42 | 7.03 |
| $[\eta]_{copoly}/[\eta]_{homo}$ | | dl/g | 2.15 | 5.53 | 10.50 | 11.50 |
| Content of propylene•ethylene copolymer | | wt. % | 50 | 30 | 55 | 25 |
| Ethylene content of propylene•ethylene copolymer | | wt. % | 40 | 45 | 44 | 46 |
| MFR | | g/10 min | 19 | 11.2 | 2.75 | 78.1 |
| Propylene•ethylene block copolymer | | | Modifier-6 | Modifier-7 | Modifier-8 | Modifier-9 |

3. Components (B) to (D)

(PP-1) and (PP-2) shown in Table 2 were employed as the propylene-ethylene block copolymer serving as Component (B); (Talc-1) and (Talc-2) shown in Table 3 were employed as the inorganic filler serving as Component (C); and (Elastomer-1) to (Elastomer-4) shown in Table 4 were employed as the ethylene elastomer or styrene elastomer serving as Component (D).

Compositions composed of Components (B) to (D) shown in Tables 2 to 4 were mixed at a ratio shown in Table 5 in advance. After 0.1 part by weight of tetrakis[methylene-3-(3', 5'-di-t-butyl-4'-hydroxyphenyl)propionate]methane ("Irganox 1010", trade name; product of Ciba Geigy) and 0.05 part by weight of tris(2,4-di-t-butylphenyl)phosphite ("Irgafos 168", trade name; product of Ciba Geigy) were incorporated as an antioxidant in the resulting composition. The resulting mixture was mixed for 5 minutes in a Henschel mixer, followed by kneading and granulation at a preset temperature of 210° C. in a twin-screw kneader ("2FCM", product of Kobe Seiko) to yield materials to be modified (Base material-1 to Base material-8).

TABLE 2

| Component (B) | Content of crystalline polypropylene portion (wt. %) | Content of propylene·ethylene random copolymer portion (wt. %) | MFR (g/10 min) |
|---|---|---|---|
| PP-1 | 80 | 20 | 25 |
| PP-2 | 93 | 7 | 110 |

TABLE 3

| Component (C) | Average particle size (μm) |
|---|---|
| Talc-1 | 20 |
| Talc-2 | 7 |

TABLE 4

| Component (D) | MFR (g/10 min) | Density (g/cm³) | Kind |
|---|---|---|---|
| Elastomer-1 | 6.3 | 0.862 | Ethylene·butene copolymer elastomer |
| Elastomer-2 | 4.5 | 0.890 | Hydrogenated styrene·butadiene·styrene triblock copolymer |
| Elastomer-3 | 11 | 0.870 | Ethylene·octene copolymer elastomer |
| Elastomer-4 | 2.0 | 0.870 | Ethylene·octene copolymer elastomer |

TABLE 5

| Composition | Component (B) Kind | Wt. % | Component (C) Kind | Wt. % | Component (D) Kind | Wt. % |
|---|---|---|---|---|---|---|
| Base material-1 | PP-1 | 76 | Talc-1 | 12 | Elastomer-1 | 12 |
| Base material-2 | PP-1 | 76 | Talc-1 | 12 | Elastomer-1 | 12 |
| Base material-3 | PP-1 | 70 | Talc-1 | 9 | Elastomer-2 | 21 |
| Base material-4 | PP-2 | 60 | Talc-1 | 20 | Elastomer-3 | 20 |
| Base material-5 | PP-1 | 65 | Talc-1 | 20 | Elastomer-4 | 15 |
| Base material-6 | PP-1 | 65 | Talc-2 | 15 | Elastomer-1 | 20 |
| Base material-7 | PP-1 | 90 | Talc-1 | 10 | — | — |
| Base material-8 | PP-1 | 83 | — | — | Elastomer-1 | 17 |

Example 1

A polypropylene resin composition was obtained by adding, to 100 parts by weight of a mixture of Base material-1 (100 parts by weight) and Modifier-1 (5 parts by weight), 0.1 part by weight of tetrakis[methylene-3-(3',5'-di-t-butyl-4'-hydroxyphenyl)propionate]methane ("Irganox 1010", trade name; product of Ciba Geigy) and 0.05 part by weight of tris(2,4-di-t-butylphenyl)phosphite ("Irgafos 168", trade name; product of Ciba Geigy), mixing them for 5 minutes in a Henschel mixer, and kneading and granulating the resulting mixture at a preset temperature of 210° C. in a twin-screw kneader ("2FCM", product of Kobe Seiko). The resulting polypropylene resin compositions were evaluated for their physical properties (MFR, distance to flow mark, and Izod impact strength at −30° C.). The evaluation results are shown in Table 6.

Examples 2 to 10, Comparative Examples 1 to 14

Modifiers shown in Table 1 were mixed with Base materials shown in Table 5 at a ratio shown in Table 6. In a similar manner to Example 1, an antioxidant was added to the resulting mixtures, followed by kneading and granulation to yield polypropylene resin compositions. The resulting polypropylene resin compositions were evaluated for their physical properties (MFR, distance to flow mark, and Izod impact strength at −30° C.). The evaluation results are shown in Table 6.

TABLE 6

| | Base material | | Component (A) | | | Appearance | | Physical properties | |
|---|---|---|---|---|---|---|---|---|---|
| | Kind | Parts by weight | Kind | Parts by weight | MFR g/10 min | Distance to flow mark mm | Judgment | Izod impact strength Kg/cm² | Judgment |
| Ex. 1 | Base material-1 | 100 | Modifier-1 | 5 | 21 | 215 | A | 4.7 | A |
| Ex. 2 | Base material-1 | 100 | Modifier-2 | 5 | 20 | 220 | A | 4.8 | A |
| Ex. 3 | Base material-1 | 100 | Modifier-3 | 5 | 21 | 205 | A | 4.5 | A |
| Comp. Ex. 1 | Base material-1 | 100 | Modifier-4 | 5 | 20 | 150 | B | 4.5 | A |
| Comp. Ex. 2 | Base material-1 | 100 | Modifier-5 | 5 | 22 | 180 | B | 3.0 | B |
| Comp. Ex. 3 | Base material-1 | 100 | Modifier-6 | 5 | 21 | 155 | B | 4.0 | A |

TABLE 6-continued

| | Base material | | Component (A) | | MFR g/10 min | Appearance | | Physical properties | |
|---|---|---|---|---|---|---|---|---|---|
| | Kind | Parts by weight | Kind | Parts by weight | | Distance to flow mark mm | Judgment | Izod impact strength Kg/cm² | Judgment |
| Comp. Ex. 4 | Base material-1 | 100 | — | 0 | 21 | 140 | B | 4.5 | — |
| Comp. Ex. 5 | Base material-2 | 100 | — | 0 | 23 | 150 | B | 5.1 | — |
| Ex. 4 | Base material-2 | 100 | Modifier-1 | 5 | 22 | 210 | A | 4.8 | A |
| Comp. Ex. 6 | Base material-3 | 100 | — | 0 | 19 | 158 | B | 4.4 | — |
| Ex. 5 | Base material-3 | 100 | Modifier-1 | 5 | 18 | 213 | A | 4.2 | A |
| Comp. Ex. 7 | Base material-4 | 100 | — | 0 | 39 | 165 | B | 4.3 | — |
| Ex. 6 | Base material-4 | 100 | Modifier-1 | 5 | 35 | 230 | A | 4.1 | A |
| Comp. Ex. 8 | Base material-5 | 100 | — | 0 | 17 | 150 | B | 5.6 | — |
| Ex. 7 | Base material-5 | 100 | Modifier-1 | 5 | 16 | 207 | A | 5.3 | A |
| Comp. Ex. 9 | Base material-6 | 100 | — | 0 | 16 | 150 | B | 5.4 | — |
| Ex. 8 | Base material-6 | 100 | Modifier-1 | 5 | 16 | 210 | A | 5.0 | A |
| Comp. Ex. 10 | Base material-7 | 100 | — | 0 | 20 | 145 | B | 4.0 | — |
| Ex. 9 | Base material-7 | 100 | Modifier-1 | 5 | 20 | 205 | A | 4.0 | A |
| Comp. Ex. 11 | Base material-8 | 100 | — | 0 | 17 | 146 | B | 7.0 | — |
| Ex. 10 | Base material-8 | 100 | Modifier-1 | 5 | 16 | 203 | A | 6.7 | A |
| Comp. Ex. 12 | Base material-1 | 100 | Modifier-7 | 5 | 21 | 170 | B | 4.5 | A |
| Comp. Ex. 13 | Base material-1 | 100 | Modifier-8 | 5 | 21 | 210 | A (gelation) | 5 | A |
| Comp. Ex. 14 | Base material-1 | 100 | Modifier-9 | 5 | 21 | 175 | B | 4.6 | A |

As is apparent from Table 6, the polypropylene resin compositions (Examples 1 to 3, 4, 5, 6, 7, 8, 9 and 10) using the modifier of the invention have an increased distance from film gate to flow mark, that is, 200 mm or greater, are improved in the appearance of their moldings, and have physical properties not so deteriorated by the addition of the modifier (Examples 1 to 10), compared with corresponding base materials (Comparative Examples 4, 5, 6, 7, 8, 9, 10, 11, 12 and 14). In Comparative Example 13, gelation occurred on the surface of its molding in spite of an increase in the distance from film gate to flow mark. When the $[\eta]_{homo}$ is greater, a distance from film gate to flow mark shows almost no increase (Comparative Example 1). When a propylene·ethylene content is small and MFR is high, the distance from film gate to flow mark shows a slight but inadequate increase and physical properties lower (Comparative Example 2). When $[\eta]_{copoly}$ is small, a $[\eta]_{copoly}/[\eta]_{homo}$ is small and MFR is high, the distance from film gate to flow mark shows almost no increase (Comparative Example 3).

The invention was described in detail with reference to specific embodiments. It is apparent for those skilled in the art that various changes or modifications can be given to it without departing from the spirit and scope of the invention.

The present application is based on Japanese Patent Application (Japanese Patent Application No. 2005-006059) filed on Jan. 13, 2005 and the content of it is incorporated herein as a reference.

INDUSTRIAL APPLICABILITY

The propylene block copolymer according to the invention can, only by adding it to a general-purpose polypropylene resin, serve as a molding appearance modifier capable of controlling molding processability during injection molding of the resulting polypropylene resin composition, and a flow mark characteristic during molding. A polypropylene resin composition having, incorporated therein, the molding appearance modifier for polypropylene resins is excellent in molding processability and flow mark characteristic. It is particularly suited for large-scale injection molding of automobile exterior parts including bumper, rocker molding, side molding, and overfender. Even in injection molded articles such as automobile exterior parts which have already been in use, addition of it to those for which appearance is a priority matter is expected to achieve improving effects. In particular, with more globalization of economic activities, there is a strong demand for the development of a resin material capable of overcoming the above-described problem in resin compositions containing a general-purpose resin (as a main component) available everywhere in the world. A molding appearance modifying resin available everywhere in the world however must be added in a large amount and has an adverse effect on the physical properties so that the invention will be an innovative technology indispensable for overcoming this problem.

The invention claimed is:

1. A polypropylene resin composition comprising 100 parts by weight of a polypropylene resin material to be modified and 1 to 25 parts by weight of a molding appearance modifier (A), which molding appearance modifier comprises as an effective component a propylene block copolymer which has a crystalline propylene polymer portion and a propylene-ethylene random copolymer portion, and satisfies the following requirements (a) to (d):

(a) the crystalline propylene polymer portion has an intrinsic viscosity $[\eta]_{homo}$ not greater than 1.2 dl/g as measured at 135° C. by using decalin as a solvent, (b) the propylene-ethylene random copolymer portion has an ethylene content of from 30 to 70 wt. %, has an intrinsic viscosity $[\eta]_{copoly}$ of from 2.5 to 7.0 dl/g, and is contained in an amount of from 40 to 80 wt. % in the whole propylene block copolymer, and (c) the propylene block copolymer has, in its entirety, a melt flow rate ranging from 0.1 to 10 g/10 min, and (d) a ratio ($[\eta]_{copoly}/[\eta]_{homo}$) of the intrinsic viscosity $[\eta]_{copoly}$ of the propylene-ethylene random copolymer portion to the intrinsic viscosity $[\eta]_{homo}$ of the crystalline propylene polymer portion falls within a range of from 2.5 to 10.

2. A polypropylene resin composition according to claim 1, wherein the polypropylene resin material to be modified comprises (B) a propylene-ethylene block copolymer.

3. A polypropylene resin composition according to claim 1, wherein the polypropylene resin material to be modified is a polypropylene resin composition comprising:

(B) from 65 to 99 wt. % of a propylene-ethylene block copolymer, and (C) from 1 to 35 wt. % of an inorganic filler.

4. A polypropylene resin composition according to claim 1, wherein the polypropylene resin material to be modified is a polypropylene resin composition comprising:

(B) from 65 to 99 wt. % of a propylene-ethylene block copolymer, and (D) from 1 to 35 wt. % of an ethylene elastomer or styrene elastomer.

5. A polypropylene resin composition according to claim 1, wherein the polypropylene resin material to be modified is a polypropylene resin composition comprising:

(B) from 45 to 98 wt. % of a propylene-ethylene block copolymer, (C) from 1 to 40 wt. % of an inorganic filler, and (D) from 1 to 40 wt. % of an ethylene elastomer or styrene elastomer.

6. A polypropylene resin composition according to claim 1, wherein the crystalline propylene polymer portion has an intrinsic viscosity $[\eta]_{homo}$ from 0.7 to 1.2 dl/g as measured at 135° C. by using decalin as a solvent.

7. A polypropylene resin composition according to claim 1, wherein the propylene-ethylene random copolymer portion has an ethylene content of from 30 to 60 wt. %, has an intrinsic viscosity $[\eta]_{copoly}$ of from 3.0 to 7.0 dl/g, and is contained in an amount of from 45 to 75 wt. % in the whole propylene block copolymer.

8. A polypropylene resin composition according to claim 1, wherein the propylene block copolymer has, in its entirety, a melt flow rate ranging from 0.1 to 9 g/10 min.

9. A polypropylene resin composition according to claim 1, wherein the ratio ($[\eta]_{copoly}/[\eta]_{homo}$) of the intrinsic viscosity $[\eta]_{copoly}$ of the propylene-ethylene random copolymer portion to the intrinsic viscosity $[\eta]_{homo}$ of the crystalline propylene polymer portion falls within a range of from 3 to 9.

10. A polypropylene resin composition according to claim 2, wherein the propylene-ethylene block copolymer (B) comprises a crystalline polypropylene polymer portion A and an ethylene-propylene random copolymer portion B.

11. A polypropylene resin composition according to claim 10, wherein portion A is present in an amount of 50 to 95 wt %, and portion B is present in an amount of from 5 to 50 wt %, the total being 100 wt %.

12. A polypropylene resin composition according to claim 2, wherein propylene-ethylene block copolymer (B) has an MFR of from 10 to 200 g/10 min.

13. A polypropylene resin composition according to claim 2, wherein propylene-ethylene block copolymer (B) has a die swell ratio of from 0.98 to 1.2.

14. A polypropylene resin composition according to claim 2, wherein propylene-ethylene block copolymer (B) has a value Q of from 3 to 7.

15. A polypropylene resin composition according to claim 2, wherein molding appearance modifier (A) is present in an amount of from 2 to 20 parts by weight, based on 100 parts by weight of propylene-ethylene block copolymer (B).

\* \* \* \* \*